June 16, 1925.  1,541,949

C. N. HAUFFE

DEMOUNTABLE RIM

Filed April 16, 1923

Inventor
C. N. Hauffe
By C. C. Shepherd
Attorney

Patented June 16, 1925.

1,541,949

UNITED STATES PATENT OFFICE.

CHESTER N. HAUFFE, OF COLUMBUS, OHIO.

DEMOUNTABLE RIM.

Application filed April 16, 1923. Serial No. 632,320.

*To all whom it may concern:*

Be it known that I, CHESTER N. HAUFFE, a citizen of the United States, residing at Columbus, in the county of Franklin and State of Ohio, have invented certain new and useful Improvements in Demountable Rims, of which the following is a specification.

The present invention is directed to improvements in demountable rims for motor vehicle wheels and has for its primary object to provide an article of this character which can be readily collapsed after being removed from the wheel to permit the pneumatic tire to be easily and quickly removed therefrom and also readily expanded for securing a replaced tire thereon.

A further object of the invention is to provide a rim of this character so constructed that when in its operative position collapsing of the parts will be positively eliminated so as to assure a rigid mounting for the tire.

A further object of the invention is to provide a rim which is extremely simple in construction and one which can be manufactured at a very small cost without sacrificing efficiency and durability of the rim.

With these and other objects in view, as will appear as the description proceeds, the invention consists in the novel features of construction, combinations of elements and arrangements of parts, and hereinafter to be fully described and pointed out in the appended claims.

Figure 1:
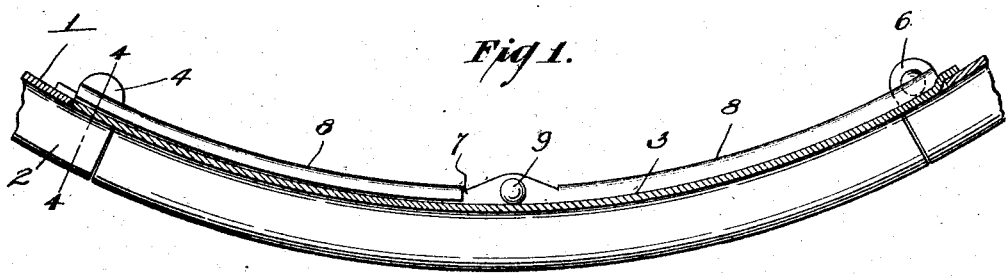
Figure 2:
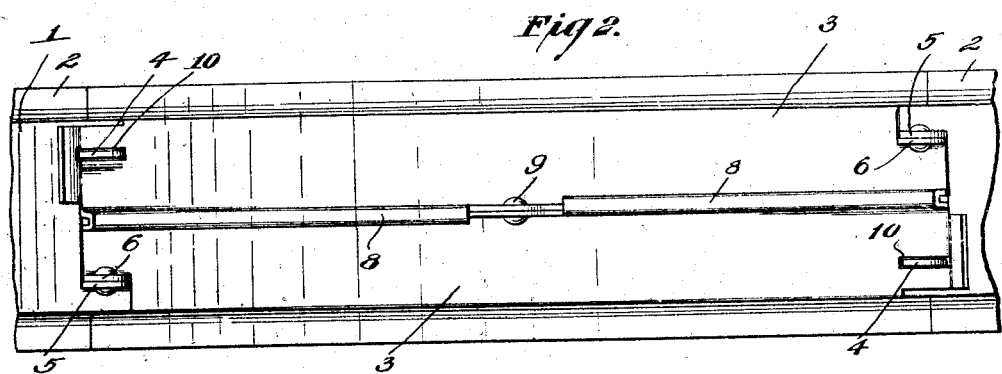
Figure 3:
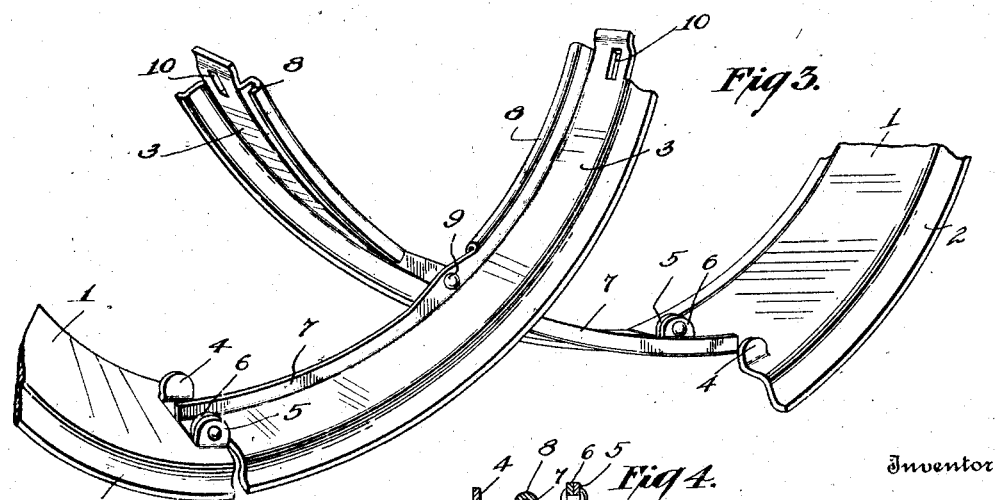
Figure 4:
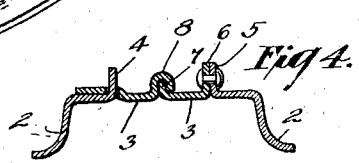

In the accompanying drawing:

Figure 1 is a longitudinal sectional view through a portion of the rim showing the sections in their operative positions, Figure 2 is an inside face view showing the sections in their locked position, Figure 3 is a perspective view of the sections in their collapsed position, and Figure 4 is a sectional view on line 4—4 of Figure 1.

Referring to the drawing 1 designates a metallic resilient rim having the usual side flanges 2 and is split transversely so that the resultant ends will be normally spaced and arranged in this space are rim sections 3.

The sections 3 are identical in construction and are each of less width than the width of the rim 1, but when in their operative positions the combined width of the sections is equal to the width of the rim 1 so as to completely fill the space between the ends and form in effect a continuation of the rim 1.

The ends of the rim 1 are each provided with vertical lugs and ears 4 and 5, respectively, and each section has an ear 6 which is pivotally connected with the respective ears 5. The sections 3 have their inner edges formed with vertical flanges 7 and channels 8, the outer ends of said flanges being pivotally connected as at 9. The outer ends of the sections are provided with slots 10 which are adapted, when the sections are in their operative positions to receive the lugs 4 and when thus engaged it will be obvious that the sections will be held firmly against longitudinal or lateral movement, the pivotally connected ears 5 and 6 aiding materially in straightening the joints.

It will be obvious that the flanges 7 are so arranged that when the sections 3 are in their expanded or operative positions the flange of one section will be received in the channel 8 of the companion section, thereby firmly interlocking the inner edges of the sections and holding the same against lateral distortion. In this manner strain upon the pivotal connections is relieved and the joints straightened at the points where the most strain is imparted, it being apparent that the channels form in effect straightening ribs for the respective sections.

While the sections 3 are in the positions as shown in Figure 3 and a tire is on the rim it is only necessary to place the foot between the sections above the pivotal connection 9 and upon exerting stress thereon the sections will be forced into lateral alignment with each other and in circular alignment with the rim 1, and when the rim is replaced upon a wheel the sections will be held against accidental collapsing.

In order to align the flanges 7 and channels 8 it is of course necessary that the ears 5 and 6 of the rim and sections, respectively, are disposed in diagonal relation, as are the lugs 4 and slots 10.

What is claimed is:

1. A collapsible rim for automobile tires comprising a transversely divided major rim section having its ends normally spaced, a minor rim section pivotally connected with each end of the major rim section and normally in engagement with the opposite ends of said major rim section, each minor rim section having means for interlocking engagement with the other, said minor rim sections being pivotally connected to each other intermediate their ends.

2. A collapsible rim for automobile tires consisting of a transversely divided major rim section having its ends normally spaced, a minor section pivotally connected with each end of the major rim section and normally in engagement with the opposite ends of said major rim section, each minor section having a longitudinal flange and channel, the flange of one minor section being adapted to engage the channel of the other minor section to interlock the adjacent sides of said sections.

3. A collapsible rim for automobile tires comprising a transversely divided major rim section having its ends normally spaced, a pair of minor rim sections pivotally connected to the ends of the major rim section and normally in engagement with the opposite ends of said major rim section, said minor sections having the combined width of the rim and pivotally connected intermediate their ends to each other, the inner edge of each minor section having aligned flanges and channels, the channel of one minor section being adapted to engage the flange of the other minor section to hold said sections against lateral displacement.

4. A collapsible rim for automobile tires comprising a demountable transversely divided major rim section, minor rim sections pivotally connected to each end of the major rim section, said minor rim sections being pivotally connected to each other intermediate of their ends and adapted to lie in parallel relation throughout their length between the spaced ends of the major rim section when said minor rim sections are in their active positions.

5. A collapsible rim for automobile tires comprising a transversely divided major rim section, a pair of minor rim sections pivotally connected to each other and to the ends of the major rim section, each minor rim section having means on one of its longitudinal edges for interlocking engagement with the similar edge of the companion section, and each of said minor sections normally spanning the space between the ends of said major rim section.

In testimony whereof I affix my signature.

CHESTER N. HAUFFE.